United States Patent [19]
Chana et al.

[11] Patent Number: 5,339,414
[45] Date of Patent: Aug. 16, 1994

[54] DATA PROCESSING SYSTEM INCLUDING LINKED FUNCTIONAL UNITS

[75] Inventors: Jit S. Chana, Totton; Pete J. Lupton, Eastleigh; Dennis L. Plum, Winchester, all of England

[73] Assignee: International Business Machines Corporation, Armonk, N.Y.

[21] Appl. No.: 965,092

[22] Filed: Oct. 22, 1992

[30] Foreign Application Priority Data

Oct. 24, 1991 [GB] United Kingdom ............ 9122544.1

[51] Int. Cl.⁵ ........................................... G06F 13/14
[52] U.S. Cl. .................... 395/650; 364/DIG. 1; 364/244.3; 364/284.2; 364/281.8
[58] Field of Search ............... 364/DIG. 1 MS File; 395/650, 325, 775

[56] References Cited

U.S. PATENT DOCUMENTS

| | | | |
|---|---|---|---|
| 4,363,093 | 12/1982 | Davis et al. | 364/DIG. 1 |
| 4,458,316 | 7/1984 | Fry et al. | 364/DIG. 1 |
| 4,837,677 | 6/1989 | Burrus, Jr. et al. | 364/DIG. 1 |
| 5,046,000 | 9/1991 | Hsu | 364/DIG. 1 |

*Primary Examiner*—Thomas M. Heckler
*Attorney, Agent, or Firm*—Floyd A. Gonzalez; George E. Clark

[57] ABSTRACT

A data processing system has a number of separate functional elements which transmit and receive data items between the various functional elements. The functional elements may be, for example, separate address spaces or regions running under a single operating system, or separate operating systems running on separate, but linked, data processors. The data processing apparatus includes a link acquisition request (LAR) stack at the requesting element and a LAR stack full processor for selecting one of several alternative actions when the stack has reached a predetermined size as indicated by a stack full indicator.

16 Claims, 6 Drawing Sheets

| | 610 | 620 | 630 |
|---|---|---|---|
| 600 → | AOR1 | 7 | 9 |
| | AOR2 | 6 | 12 |
| | — | — | — |
| | — | — | — |
| | — | — | — |

FIG.6

| | 710 | 720 | 730 | 740 |
|---|---|---|---|---|
| | NATURE OF DATA ITEM | REROUTE | ALTERNATIVE PATHS | STACK |
| | ALL_AOR1 | Y | AOR2 AOR3 | N |
| | FILEA_FOR1 | Y | FOR2 FOR4 | Y |
| | FILEB_FOR1 | Y | FOR3 FOR4 | Y |
| 700 → | FILEC_FOR1 | N | — | Y |
| | — | | | |
| | — | | | |
| | — | | | |
| | — | | | |
| | — | | | |

FIG.7

DATA PROCESSING SYSTEM INCLUDING LINKED FUNCTIONAL UNITS

BACKGROUND OF THE INVENTION

The present invention relates to data processing systems.

In large data processing systems tasks are commonly performed by one of a number of related operating elements. When an operating system such as the IBM MVS system is used, these elements may be separate virtual address spaces under a single operating system. Alternatively, the elements may correspond to individual operating systems running on data processing machines which are linked by a data network to form a single data processing system.

Operation using multiple linked elements gives several advantages. Each operating element can be made effectively autonomous, so that failure of one element should not affect the others. The virtual or real storage addressed by one element can be made inaccessible to other elements to prevent accidental erasure or overwriting. If each operating element is restricted in the amount of virtual storage which can be addressed, then subdividing a large program between a number of operating elements can increase the storage available to that program. Large data files can be held in a single element with selective access being given to other elements, so avoiding the need for multiple copies of the files. Finally, in a multiprocessor environment, system restrictions may mean that a single operating element can only use one central processing unit (CPU). The use of a number of operating elements would then allow the full potential of the multiple CPUs to be realized.

The accompanying FIGS. 1 and 2 show how data processing operations may be subdivided between a number of elements as described above. In FIG. 1 the operating elements correspond to separate operating systems residing on separate, but linked, data processing machines. This arrangement will be referred to as an 'intersystem communication' (ISC) configuration. In the example shown, two data processing machines are linked by data link 30. Each machine has corresponding terminals 40, 50 and storage apparatus 60, 70.

Similarly in FIG. 2 'multiregion operation' (MRO) is shown, in which a number of computer programs run on the same data processing machine and under the same operating system, but in different address spaces or regions. Here two regions 110, 120 are shown running on the single machine 100. The regions may run production and test versions of a single computer program, or different versions of the same program for use by different departments in a company, or different parts of a larger overall program. Communication between the regions is possible, and the programs can share the same terminals 130, 140 and storage apparatus 150. Alternatively each region 110, 120 can have associated dedicated terminals (130, 140 respectively) or other peripheral apparatus.

An example of a computer program which is designed to operate in an ISC or MRO configuration is the IBM CICS/MVS computer program operating under the IBM MVS operating system. (IBM, CICS/MVS and MVS are trademarks of the International Business Machines Corporation). Such operation is described in IBM manual number SC33-0519, entitled 'CICS/MVS Version 2.1 Intercommunication Guide' (first edition, April 1988).

FIG. 3 shows another typical use of MRO or ISC operation, in which each region or machine provides a different type of function as part of an overall system 200. User commands and output data are handled by a terminal owning region (TOR) 210, application programs are processed in a number of application owning regions (AORs) 220, 230, and file handling and data storage are performed by a file owning region (FOR) 240. This arrangement simplifies terminal and file handling arrangements and allows higher priority applications to be run in faster or higher priority regions.

In order that a system may be subdivided as shown in FIG. 3 there must be some means for communicating data items such as variables and instructions between the regions. Some communication paths may be forbidden or simply not required, such as direct communication between the TOR and FOR. Communication is initiated by the acquisition of one or more real or virtual links between the two regions or elements. Normally the acquisition and relinquishing of the links is an ongoing process which does not cause a bottleneck of link acquisition requests to build up, assuming that sufficient links are provided. However if for some reason the flow of work is held up such that link acquisition requests are being made more often than links are being relinquished, acquisition requests are held by the requesting element in a stack of waiting requests. Again, in most cases any slow down in the relinquishing of links is only temporary so those requests held in the stack can be serviced and operation returned to normal.

A more realistic scenario is shown in FIG. 4, in which there are a number of interconnected TORs (300, 310, 320), AORs (330, 340, 350, 360) and FORs (370, 380, 390). A typical installation could have several hundred different regions or elements.

Although it was stated above that MRO or ISC operation tends to prevent the failure of one region or element causing failure of another region, circumstances will now be described in which this can occur. Consider a major problem occurring in one of the FORs (for example FOR 370 in FIG. 4), such that that FOR slows down or halts operation without actually terminating operation. This will cause a build up of stacked or waiting link acquisition requests at the AORs. Sooner or later one of these AORs will have so many link acquisition requests waiting to be serviced and therefore using up storage and other resources, that it will itself slow down or stop operation. This in turn will cause similar problems at other FORs, other AORs, and of course the TORs. In this way the failure of one region can cause a spread of sympathetic failure to other regions throughout the overall system.

One prior art solution to the problem described above is to run a continuous program in each region to check the status of all other regions to which communication might be addressed. This is wasteful of processor resources and could exacerbate the situation because of the additional work and link traffic it would generate.

A further prior art solution is to set a limit on the amount of work sent by one region to another, in order to limit the total workload of the recipient region. However, this does not take into account the fact that other regions may also be sending work to the same recipient. Also, in a typical data processing installation the number of regions may well increase as the system is expanded over the course of perhaps a few days or weeks.

It would be very inconvenient to have to reset the workload limits whenever a new region is added. In order to prevent sympathetic failure the limits would have to be conservative, so this solution can also restrict the total throughput of the system.

SUMMARY OF THE INVENTION

According to the present invention there is provided data processing apparatus in which data items are communicated via data links between separate functional elements forming part of the apparatus, comprising means for holding a link acquisition request in a stack at the requesting element if the requested link is in use, means for determining whether the stack of waiting requests has reached a predetermined size, and condition handling means for determining subsequent operation when the stack of waiting requests has reached the predetermined size.

In at least a preferred embodiment the invention provides a means of dynamically and remotely monitoring the state of a recipient element by detecting a build up of link acquisition requests for communication to that recipient. If the build up of waiting requests reaches a threshold suitable action can be taken to prevent the requesting element suffering from sympathetic failure. This is advantageous for several reasons, including:

a) the monitoring is performed at the sending element, so it does not increase the data traffic between the elements; and b) the monitoring is based on the rate of requests and so can easily be tuned to the required workload.

The number of outstanding link acquisition requests is preferably examined whenever a new request is made. This means that the processing overhead required to make use of the invention is low, since extra processing is performed only when needed. However, the number of outstanding requests could be examined at intervals.

Several options are available when it is determined that a stack has reached its predetermined limit. For example, further processing could be rerouted to other operating elements, if this is appropriate. If it is not possible to reroute a particular request it could be added to the stack until a second, final, predetermined limit is reached at which point all present link traffic and outstanding acquisition requests could be removed and the links closed to cause subsequent link acquisition requests to fail completely rather than being stacked. Alternatively further data items could simply be rejected when the (first) predetermined limit is reached.

Preferably the condition handling means is responsive to the nature of the link acquisition request and to predetermined routing information stored in the data processing apparatus, and includes means for determining whether the request can be rerouted to a different functional element and means for initiating a request for acquisition of a link to that different element in the case when the request can be rerouted.

It is preferred that each stack has an associated size limit which can be altered during operation of the data processing apparatus. These features allow flexibility in allocating work to each of the elements according to the nature of the element or perhaps the time of day. For example, in an ISC configuration, one element may be a much more powerful machine than those used in the other elements. The number of outstanding requests for link acquisition to that element might then be allowed to be greater than those corresponding to other elements.

The invention is applicable to, for example, data processing apparatus in which a number of regions execute under a single operating system (MRO operation), or in which the apparatus comprises a network of data processors each having its own operating system (ISC operation). The data processing apparatus may be arranged as a distributed transaction processing system which preferably includes elements adapted to interface to user terminals (TORs), elements adapted to run application programs (AORs), and elements adapted to access data storage (FORs).

BRIEF DESCRIPTION OF THE DRAWINGS

In order that the invention may be fully understood a preferred embodiment thereof will now be described, by way of example only, with reference to the accompanying drawings in which:

FIG. 6 is a schematic representation of a table of stack thresholds; and

FIG. 7 is a schematic representation of information held by the condition handler.

DESCRIPTION OF THE PREFERRED EMBODIMENT

Of the above drawings, FIGS. 1 to 4 have been described earlier in the present application.

Figure 1:
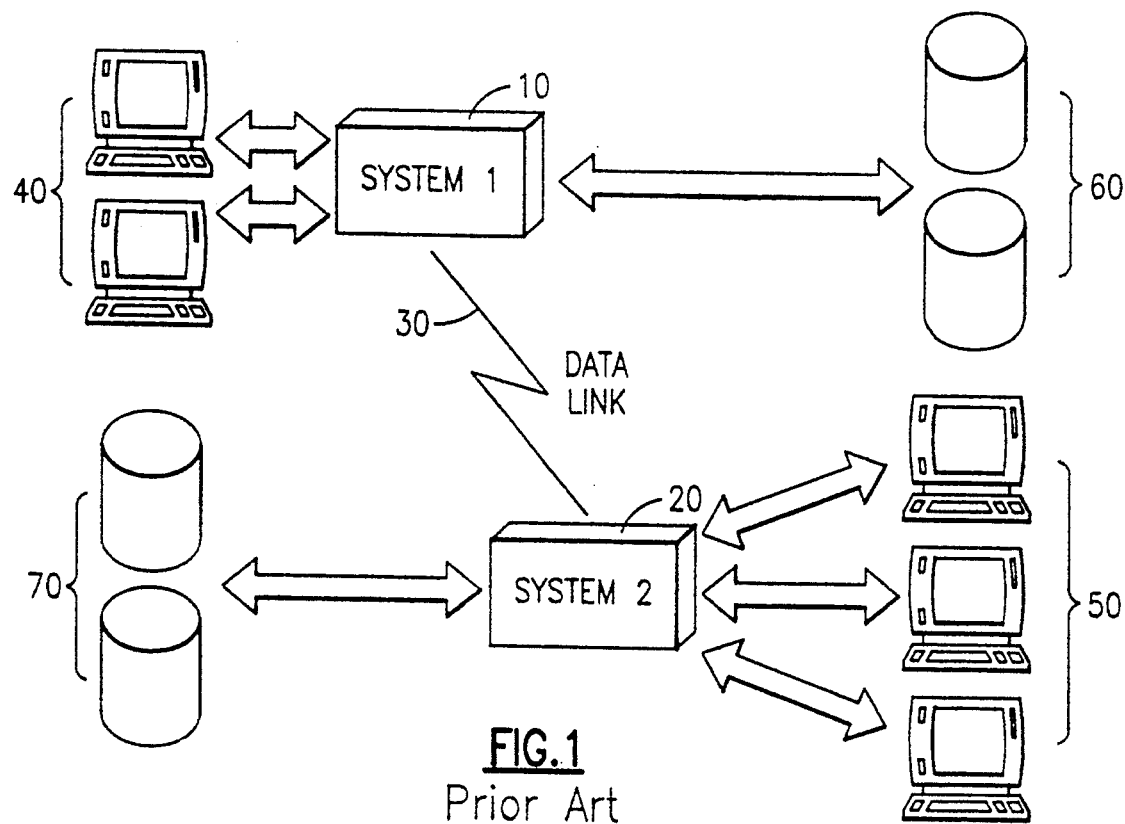
FIG. 1 shows a data processing system arranged in an ISC configuration, as known in the prior art.
Figure 2:
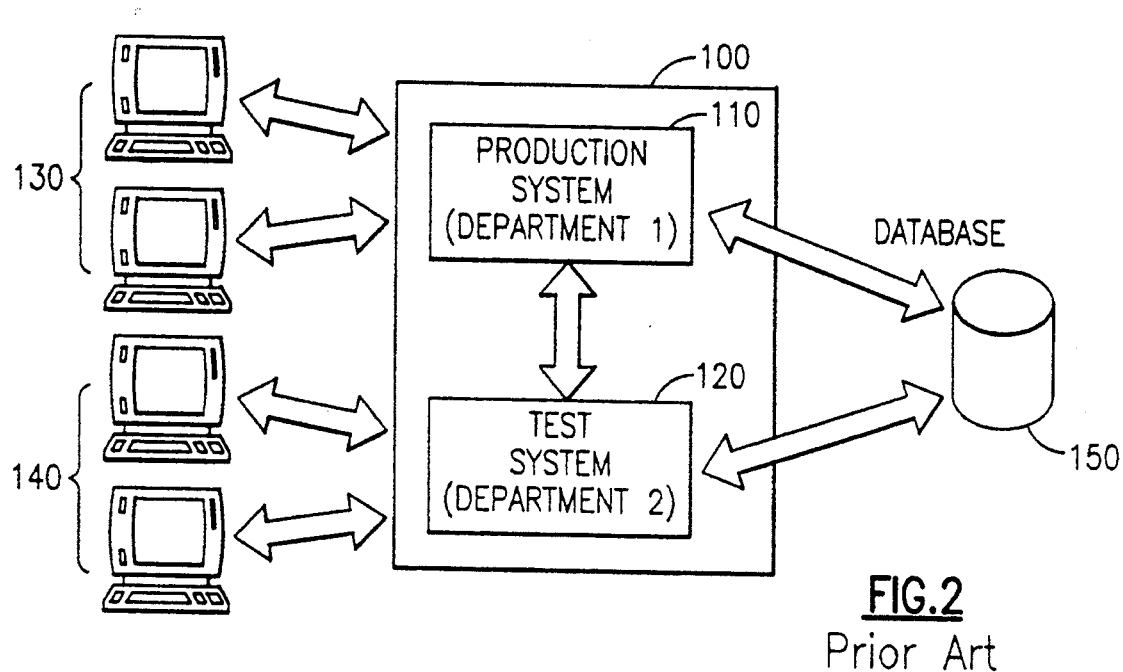
FIG. 2 shows a data processing system arranged in an MRO configuration, as known in the prior art.
Figure 3:
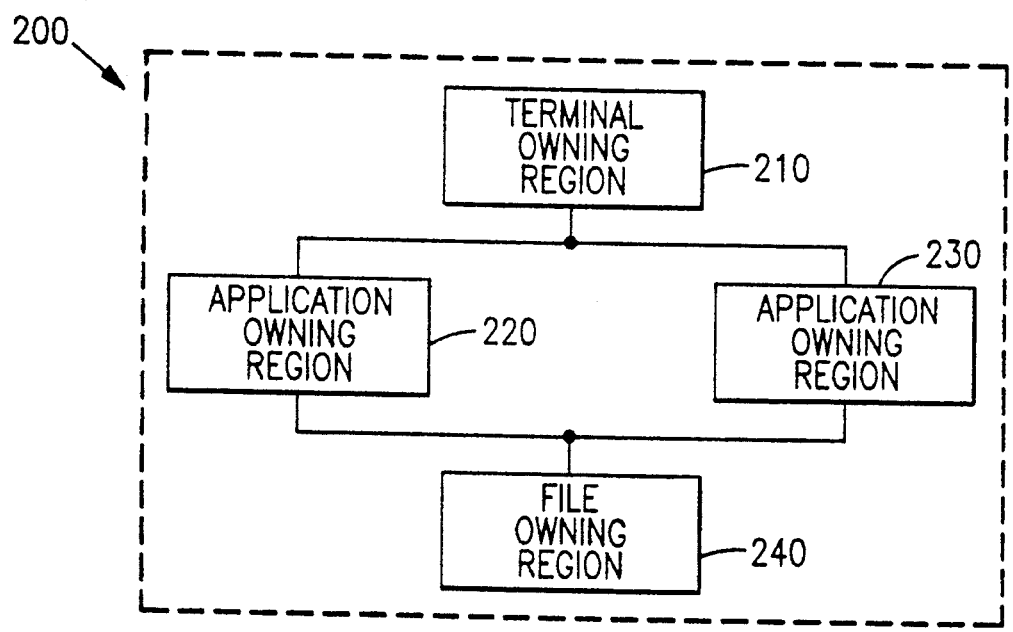
FIGS. 3 and 4 show data processing operations distributed between operating elements according to function, as known in the prior art.
Figure 4:
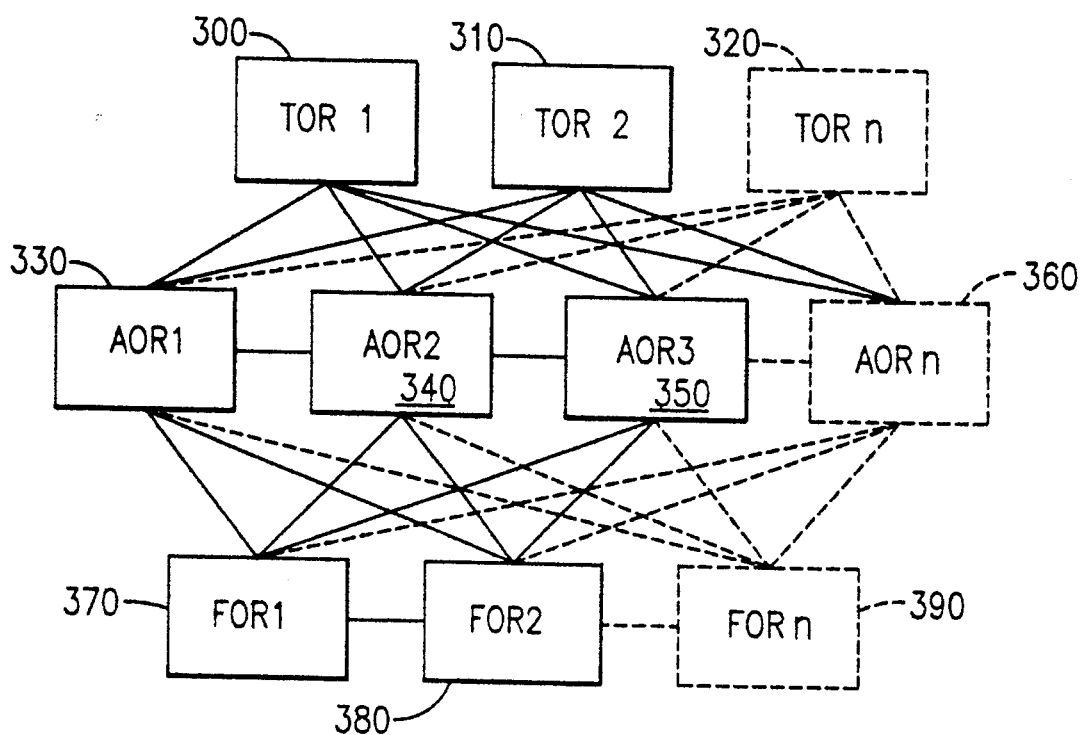
Figure 5:
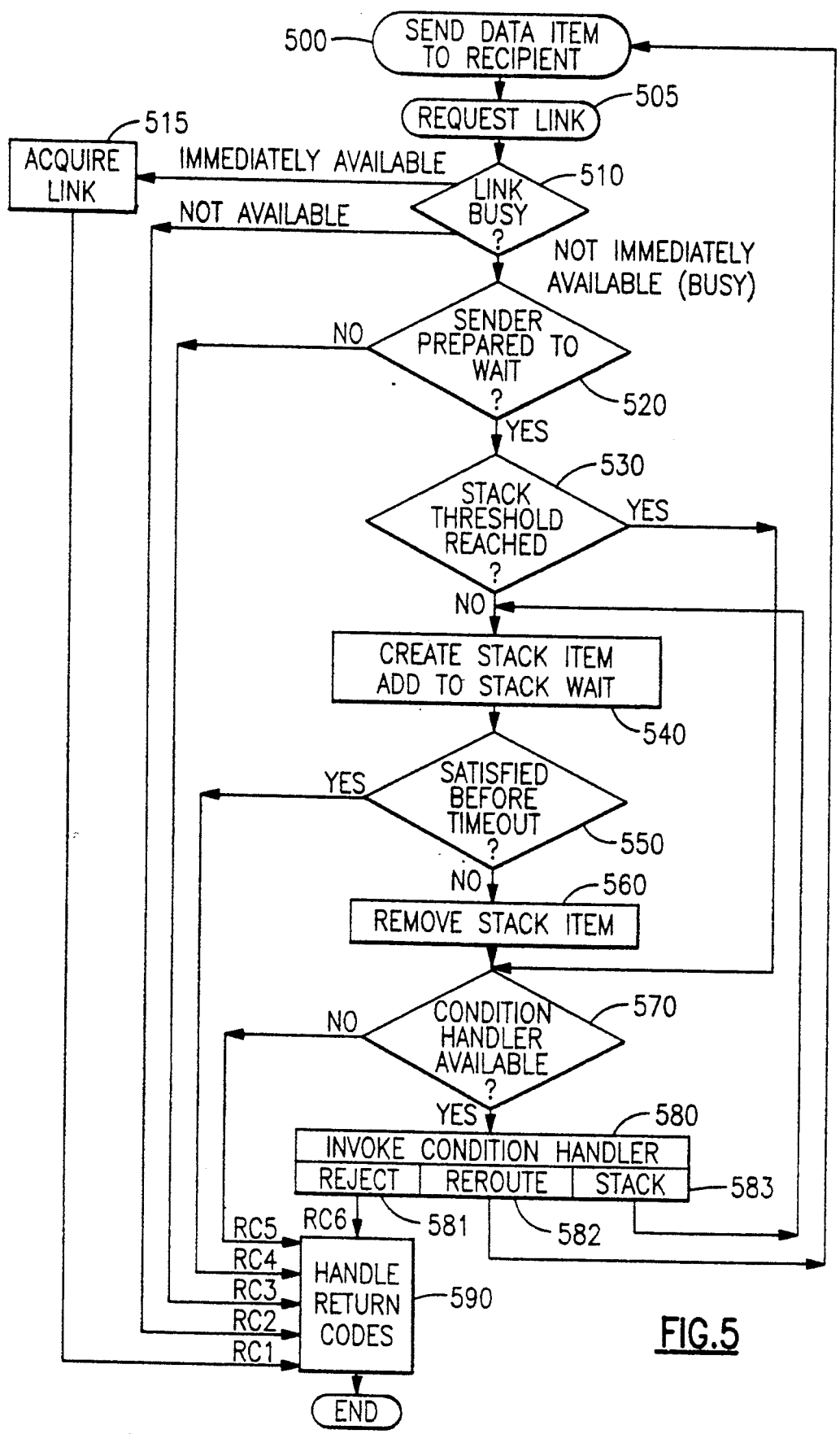
FIG. 5 is a flowchart showing the allocation of data items to stacks for communication between operating elements, according to the present invention.

Referring now to FIG. 5, an initial request 500 to send a data item to a recipient is shown. A request 505 is made by the sender to acquire temporary use of a data link between the sender and recipient. At step 510 a check is made of whether such a link is available. If a link is immediately available then that link is acquired at 515 for subsequent use, and the process exits with a successful return code RC1, which is handled at step 590.

A second possibility at step 510 is that the link is not available. This could be because the recipient element has been disconnected from the data processing apparatus, or perhaps because its logical name or address has been incorrectly specified to the apparatus. In this case an unsuccessful return code RC2 is given, which is handled at step 590.

An intermediate response at step 510 is that the requested link is busy (in use) and so is not immediately available for use by the sender. In this case at step 520 it is determined whether the sending element is able to wait for the link to become free. If the sending element is not prepared to wait then the process exits with an unsuccessful return code RC3 which is handled at step 590. If however the sender can wait then the number of outstanding or waiting requests for acquisition of a link by that sender for communication to that recipient is checked at step 530.

Under normal circumstances, waiting link acquisition requests are held in a stack or ordered list. When the requested link becomes free, the waiting request at the head of the stack is serviced.

Each stack has an associated predetermined size threshold. In normal operation, the threshold is unlikely to be reached. If a stack reaches its threshold size, this is a probable indication that operation of the recipient element has slowed down or stopped, and that action should be taken to prevent sympathetic failure of the requesting element. The thresholds are stored as a table at each sender. An example of such a table is shown in FIG. 6, to be described below.

If the stack has reached its threshold, then control is passed from step 530 to step 570. However, assuming the stack has not reached its threshold, a stack item corresponding to the link acquisition request is created and added to the stack at step 540.

If the request is successfully serviced before the end of a predetermined timeout period, then the process exits with a successful return code RC4. However, if the request is not serviced before the timeout period expires, the stack item corresponding to that request is removed from the stack at step 560 and control is passed to step 570.

At step 570, a check is made as to whether a condition handler is available. If not, the process exits with an unsuccessful return code RC5. If the condition handler is in fact available, then it is invoked at step 580. The condition handler selects one of three options for the link acquisition request. The request can be rejected at 581, in which case the process exits with an unsuccessful return code RC6. If the data item to be sent using the requested link can be handled appropriately by a different element to the original recipient, then it is rerouted at 582, in which case control returns to the start 500 of the process and a request for acquisition of a link to the new recipient is made. If the data item is not suitable for rerouting, the link acquisition request can be returned to the stack of waiting items at 583, in which case another timeout period is started.

The basis on which the condition handler decides whether to reject (581), reroute (582) or stack (583) a timed-out request is described below in connection with FIG. 7.

The following list summarises the possible outcomes handled at step 590 by the return code handler:

| Return Code | Outcome |
| --- | --- |
| RC1 | Request immediately satisfied |
| RC2 | Link not available |
| RC3 | Link busy, but sender cannot wait |
| RC4 | Request stacked but satisfied before timeout expires |
| RC5 | Request stacked but not satisfied before timeout expires. Condition Handler not available |
| RC6 | Request rejected by Condition Handler |

These return codes are passed back to the program which initiated the link acquisition process.

FIG. 6 shows an example of a table 600 held at each sending element which defines the stack thresholds corresponding to the possible recipient elements. Some communication paths are forbidden, such as direct communication between a TOR and an FOR in FIG. 4, so no entry need be made in the table for a stack size for the forbidden links.

The table simply comprises a list 610 of all allowed recipient elements for that sending element, with a corresponding stack size threshold 620 for communication to that recipient. Optionally a second, higher, threshold entry 630 may be included. In the case where the condition handler elects to return a request to the stack, the stack size may exceed the first threshold 620. However, it is not desirable that the stack can then continue to grow without limit, because this could well cause sympathetic failure of the sending element. Accordingly, when the second threshold is reached, more drastic action can be taken by the condition handler, such as rejecting all stacked requests and issuing a request to make the links unavailable so that subsequent link acquisition requests fail quickly with return code RC2.

In the present embodiment, each sender has its own table 600, but tables could be shared between sending elements if appropriate. The information in table 600 is set up by the system operator, and can be varied during operation.

FIG. 7 shows the information used by the condition handler in deciding whether to reject, reroute or stack a link acquisition request. Again, in the present embodiment, this information is arranged as a table 700. The table 700 comprises an entry 710 denoting the nature of the data item to be sent using the requested link and, corresponding to that data item type, three further entries 720, 730 and 740. Entry 720 is a yes/no flag indicating whether a data item of that type is suitable to be rerouted. If rerouting is allowed, entry 730 comprises a list of alternate paths to alternative recipient elements. This list may be in order of preference. Finally, entry 740 is a second yes/no flag indicating whether the request should be returned to the stack.

The particular examples of data types shown in FIG. 7 have the following meanings:

| | |
| --- | --- |
| ALL_AOR1: | All requests for access to region AOR1 |
| FILEA_FOR1: | Access to file A held in region FOR1 |
| FILEB_FOR1: | Access to file B held in region FOR1 |
| FILEC_FOR1: | Access to file C held in region FOR1 |

The information in table 7 can be set up by the operator of the data processing apparatus and can be varied during operation, if required. By consulting the list the condition handler operates in a heuristic manner. In operation, the condition handler determines the nature of the data item to which the link acquisition relates, using information from the program which made the request and from other sources such as centrally held link status information. The condition handler then consults the table 700 to determine which set of entries corresponds to that data type. If the reroute flag 720 is set to 'yes', then another recipient element is selected from the list in entry 730. If the alternative elements are not available, or if the reroute flag is set to 'no', then the stack flag in entry 740 is consulted. If the stack flag is set to 'yes' then the request is returned to the stack as described above. If the stack flag is set to 'no', then the request is rejected, again as described above.

Figure 8:
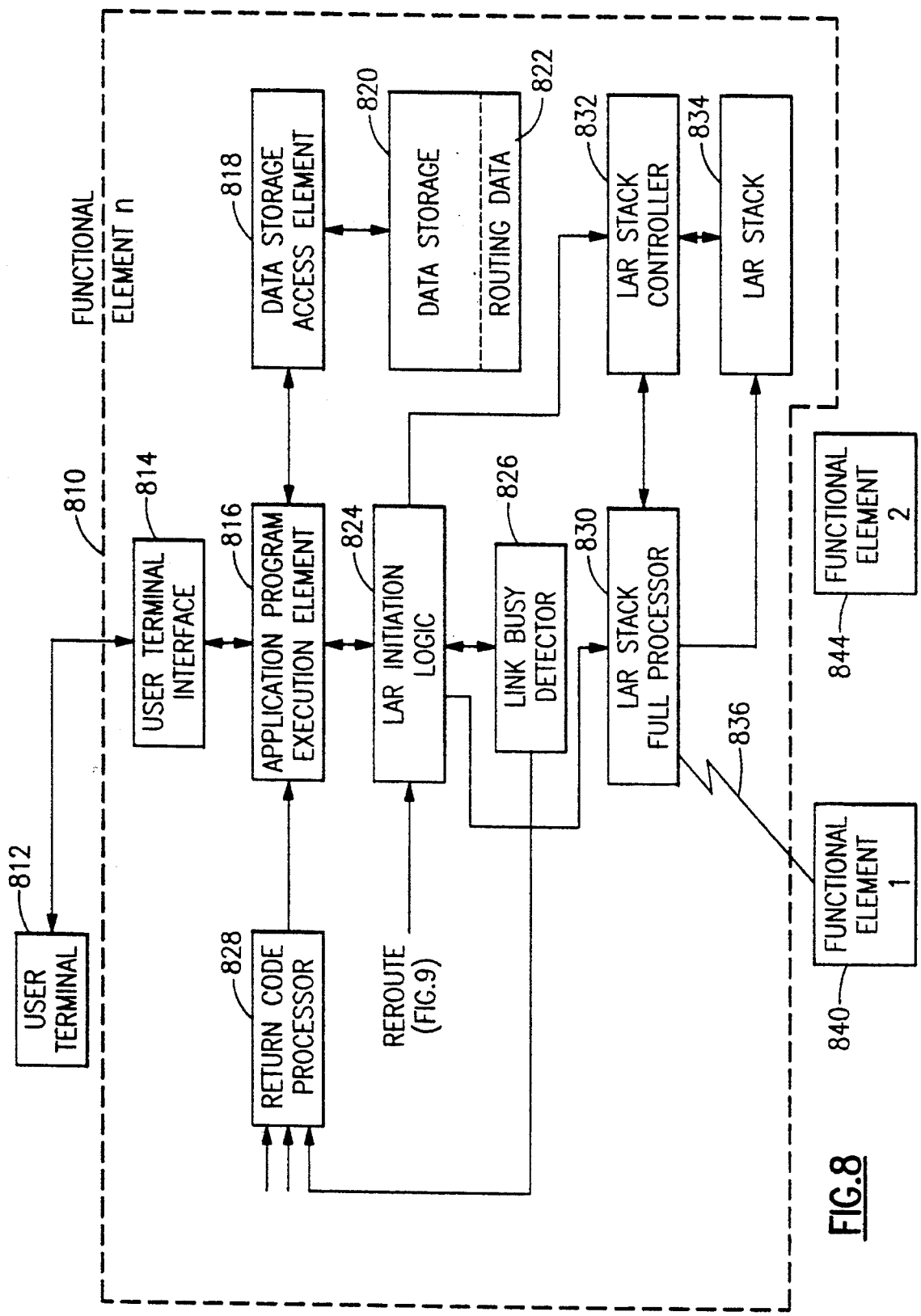
FIG. 8 is a block diagram of a data processing system in accordance with the present invention.
Figure 9:
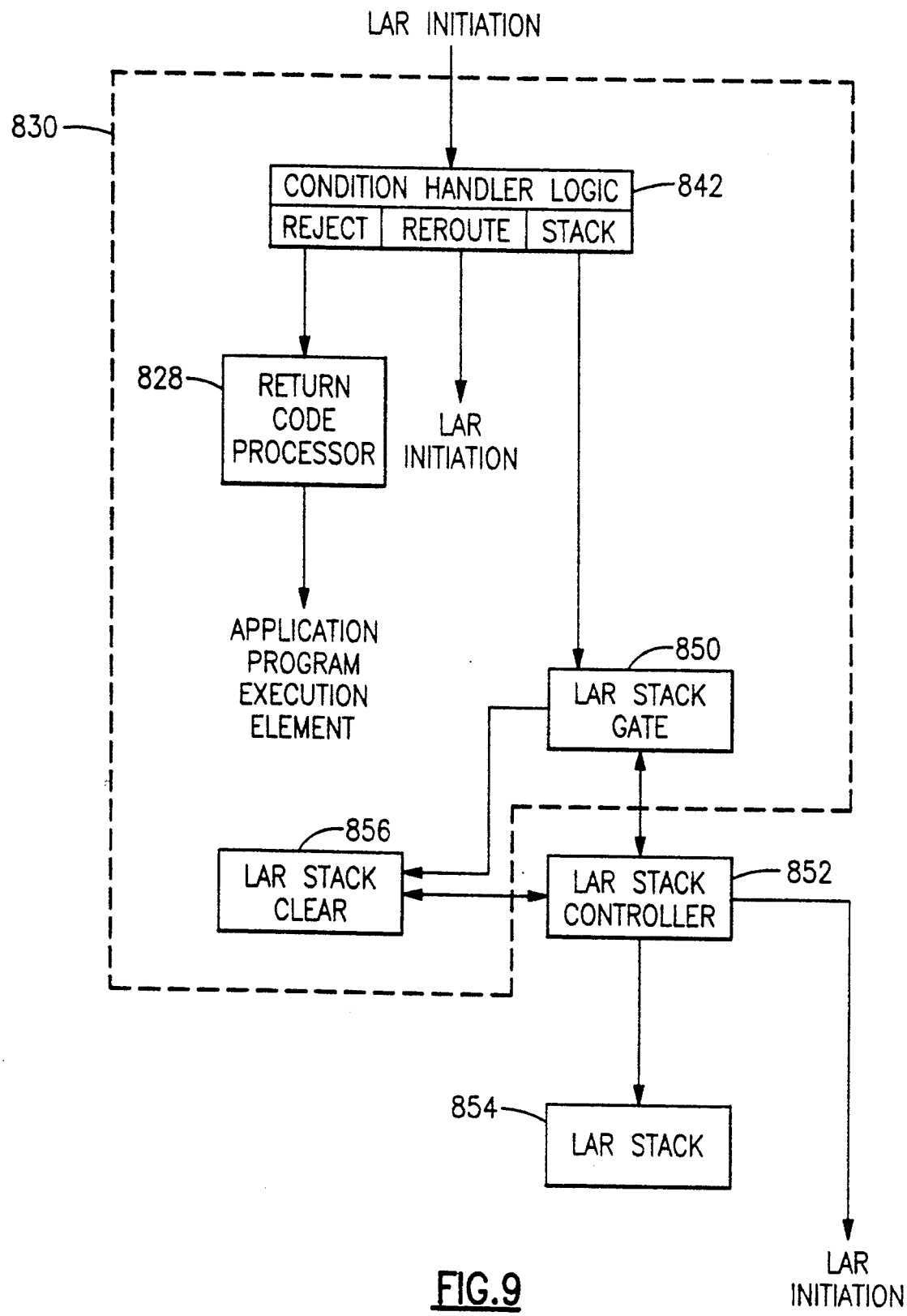
FIG. 9 is a block diagram of the link acquisition request stack control mechanism in accordance with the data processing system of FIG. 8 embodying the present invention.

Referring now to FIGS. 8 and 9, apparatus embodying the present invention will be described.

Functional element n 810 is connected to user terminal 812 through user terminal interface logic 814 which interacts with the application program execution element 816. Application program execution element 816 is connected to data storage access element 818 which interacts directly with data storage 820 having a portion thereof 822 devoted to storing routing data.

Application program execution element 816 is also connected to the link acquisition request (LAR) initiation logic 824 which handles the link acquisition process when a request for a link has been initiated.

LAR initiation logic 824 is connected to link busy detector 826 which determines whether the functional element which is the subject of the link request is available for the current link acquisition request. If the functional element is available, link busy detector 826 signals LAR initiation logic 824, and the link is acquired. If the functional element to be linked is not available, link busy detector 826 presents a return code to return code processor 828, and the attempt to link to that particular functional element is ended.

If the functional element to be linked is not immediately available, but merely busy, link busy detector 826 signals LAR initiation logic 824, and the process of link acquisition continues as is described above with respect to FIG. 5. If a link acquisition request must be stacked, LAR initiation logic 824 communicates to LAR stack full processor 830 which is connected to LAR stack controller 832, and LAR stack 834.

LAR stack full processor 830 is described in greater detail with respect to FIG. 9. LAR stack full processor 830 handles LAR stack full condition and determines which of several alternative actions is to be taken if the LAR stack is full (see FIG. 5 Stack Threshold Reached 530).

LAR stack full processor 830 controls LAR initiation logic 824 in establishing a data link such as link 836 between functional element 810 and functional element 840.

Referring now to FIG. 9, LAR stack full processor 830 will be described in more detail. LAR initiation logic 824 is connected to condition handler logic 842 which provides for one of several actions to be taken depending upon the current state of the system.

The acquisition request may be rejected in which case a reject signal is transmitted to return code processor 828 from condition handler logic 842, and the request is ended. If a data item is to be sent, but to a different functional element 844 than the originally designated recipient, functional element 840, a reroute signal is transmitted from condition handler logic 842 to LAR initiation logic 824, and a new request for link acquisition is made to the alternate functional element 844.

If the data item cannot be rerouted, condition handler logic 842 sends the LAR request to LAR stack gate 850 which under the control of LAR stack controller 852 adds the request to LAR stack 854.

If as described above with respect to FIG. 6, a second, higher stack threshold is reached in LAR stack 854, it may be desirable to reject all stacked requests. LAR stack clear logic 856 operates under the control of LAR stack controller 852 to reject all stacked requests as described above with respect to FIG. 6.

Therefore in at least a preferred embodiment there has been described a means of dynamically and remotely monitoring the state of a recipient element by detecting a build up of link acquisition requests for communication to that recipient. Depending on the nature of the data item to be sent, and other aspects of the requested communication, a decision can be made automatically as to how subsequent link acquisition requests should be handled once the stack of waiting requests has reached a first predetermined limit. In the described embodiment the stack is never allowed to grow out of control, thus avoiding sympathetic failure of the requesting element.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desired to secure by Letters Patent is:

1. Data processing apparatus in which data items are communicated by data links between functional units forming part of said apparatus, wherein requesting functional elements issue link acquisition requests (LAR), requesting links to other functional elements, said data processing apparatus comprising:
   means for storing a LAR in a stack at a requesting functional element;
   means connected to said LAR stack for determining whether said stack of waiting requests has reached a predetermined size;
   means connected to said storing means and said determining means for selecting one of several alternative actions when said means for storing a LAR has reached said predetermined size.

2. Data processing apparatus according to claim 1 in which said selecting means is responsive to characteristics of said LAR and to routing information stored in a data storage.

3. Data processing apparatus according to claim 2 wherein said selecting means further comprises:
   means for determining whether said request can be rerouted to a different functional element; and
   means for initiating a request for acquisition of a link to said different element in a case where said request can be rerouted.

4. Data processing apparatus as claimed in claim 3, in which the selecting means includes means for determining whether the request should be added to the stack in the case when the request cannot be rerouted to a different functional element.

5. Data processing apparatus as claimed in claim 4 in which no further requests can be added to the stack if the stack size reaches a second predetermined size, the second predetermined size being greater than the first mentioned predetermined size.

6. Data processing apparatus as claimed in claim 5 in which the selecting means includes means for removing all requests from the stack and requesting closure of the data links between the sending and receiving elements when the stack size reaches the second predetermined size.

7. Data processing apparatus as claimed in claim 1, in which each functional element has a stack, and in which each stack has an associated predetermined size.

8. Data processing apparatus as claimed in claim 1, in which the apparatus comprises a data processing system having a number of regions which execute under a single operating system.

9. Data processing apparatus as claimed in claim 1, in which the apparatus comprises a network of data processors each having its own operating system.

10. Data processing apparatus as claimed in claim 1, in which the apparatus operates as a distributed transaction processing system.

11. Data processing apparatus as claimed in claim 1, in which the predetermined size can be altered during operation of the data processing apparatus.

12. Data processing apparatus according to claim 1 wherein each of said functional elements further comprises:
 a user terminal interface element;
 an application program execution element; and
 a data storage access element.

13. A method for communicating data items by data links between functional units forming part of a data processing system, comprising the steps of:
 issuing link acquisition requests (LAR) from a requesting functional unit, requesting one or more links to other functional units in said data processing system;
 storing a LAR in a stack at said requesting functional unit;
 determining whether said stack of waiting requests has reached a first predetermined size;
 selecting one of several alternative actions when said determining step indicates that said stack of waiting requests has reached said first predetermined size.

14. A method according to claim 13 in which said selecting step is responsive to characteristics of said LAR.

15. A method according to claim 14 wherein said selecting step is further responsive to routing information stored in a data storage.

16. A method according to claim 13 wherein said selecting step further comprises:
 determining whether said request can be rerouted to a different functional unit; and
 initiating a request for acquisition of a link to said different functional unit in a case where said request can be rerouted.

* * * * *